United States Patent
Hayashi et al.

(10) Patent No.: US 11,790,184 B2
(45) Date of Patent: Oct. 17, 2023

(54) SYSTEMS AND METHODS FOR SCIENTIFIC CONTRIBUTION SUMMARIZATION

(71) Applicant: salesforce.com, inc., San Francisco, CA (US)

(72) Inventors: Hiroaki Hayashi, Pittsburgh, PA (US); Wojciech Kryscinski, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 330 days.

(21) Appl. No.: 17/161,327

(22) Filed: Jan. 28, 2021

(65) Prior Publication Data

US 2022/0067302 A1     Mar. 3, 2022

Related U.S. Application Data

(60) Provisional application No. 63/071,673, filed on Aug. 28, 2020.

(51) Int. Cl.
*G06F 40/40*     (2020.01)
*G06F 40/284*     (2020.01)
(Continued)

(52) U.S. Cl.
CPC ............ *G06F 40/40* (2020.01); *G06F 40/284* (2020.01); *G06N 5/04* (2013.01); *G06N 20/00* (2019.01); *G06F 40/30* (2020.01)

(58) Field of Classification Search
CPC .... G06F 40/216; G06F 40/279; G06F 40/284; G06F 40/30; G06F 40/40; G06F 16/3344;
(Continued)

(56) References Cited

U.S. PATENT DOCUMENTS

| 2013/0311471 | A1* | 11/2013 | Okajima | G06F 16/345 |
| | | | | 707/737 |
| 2021/0319288 | A1* | 10/2021 | Wagner | G06F 40/216 |
| 2022/0027578 | A1* | 1/2022 | Chorakhalikar | G06N 3/045 |

OTHER PUBLICATIONS

Adams, Christopher, and Derrick Tate. "Computer-aided TRIZ ideality and level of invention estimation using natural language processing and machine learning." Growth and Development of Computer-Aided Innovation: Third IFIP WG 5.4 Working Conference, CAI 2009, Harbin, China, Aug. 20-21, 2009. (Year: 2009).*

(Continued)

*Primary Examiner* — Daniel C Washburn
*Assistant Examiner* — Paul J. Mueller
(74) *Attorney, Agent, or Firm* — HAYNES AND BOONE LLP

(57) ABSTRACT

Embodiments described herein provide natural language processing (NLP) systems and methods that provide a customized summarization of scientific or technical articles, which disentangles background information from new contributions, and summarizes the background information or the new information (or both) based on a user's preference. Specifically, the systems and methods utilize machine learning classifiers to classify portions of sentences within the article as containing background information or as containing a new contribution attributable to the article. The systems and methods then incorporate the background information in the summary or incorporate the new contribution in the summary and output the summary. In this way, the systems and methods can provide summaries of scientific literatures, which largely accelerates literature review in scientific fields.

14 Claims, 7 Drawing Sheets

(51) Int. Cl.
*G06N 5/04* (2023.01)
*G06N 20/00* (2019.01)
*G06F 40/30* (2020.01)

(58) Field of Classification Search
CPC ........ G06F 16/345; G06N 3/084; G06N 5/04; G06N 20/00
See application file for complete search history.

(56) References Cited

OTHER PUBLICATIONS

Wu, Jheng-Long. "Patent quality classification system using the feature extractor of deep recurrent neural network." 2019 IEEE International Conference on Big Data and Smart Computing (BigComp). IEEE, 2019. (Year: 2019).*

* cited by examiner

SYSTEMS AND METHODS FOR SCIENTIFIC CONTRIBUTION SUMMARIZATION

CROSS-REFERENCE

The present application claims priority to U.S. Provisional Patent Application No. 63/071,673, entitled "SYSTEMS AND METHODS FOR SCIENTIFIC CONTRIBUTION SUMMARIZATION," filed on Aug. 28, 2020, which is herein incorporated by reference in its entirety for all purposes.

TECHNICAL FIELD

The present disclosure relates generally to machine learning models and neural networks, and more specifically, to natural language processing (NLP).

BACKGROUND

A large amount of scientific and technical articles are published every year, imposing a need for researchers to actively review and come up to speed on the state of the art in their respective field. Thus, literature review alone, in research and development, can be costly and time-consuming. In addition, reviewing technical and/or scientific publications often requires a certain level of expertise. Therefore, there is a need for efficient NLP systems that provide summarization of scientific or technical articles.

Figure 1:
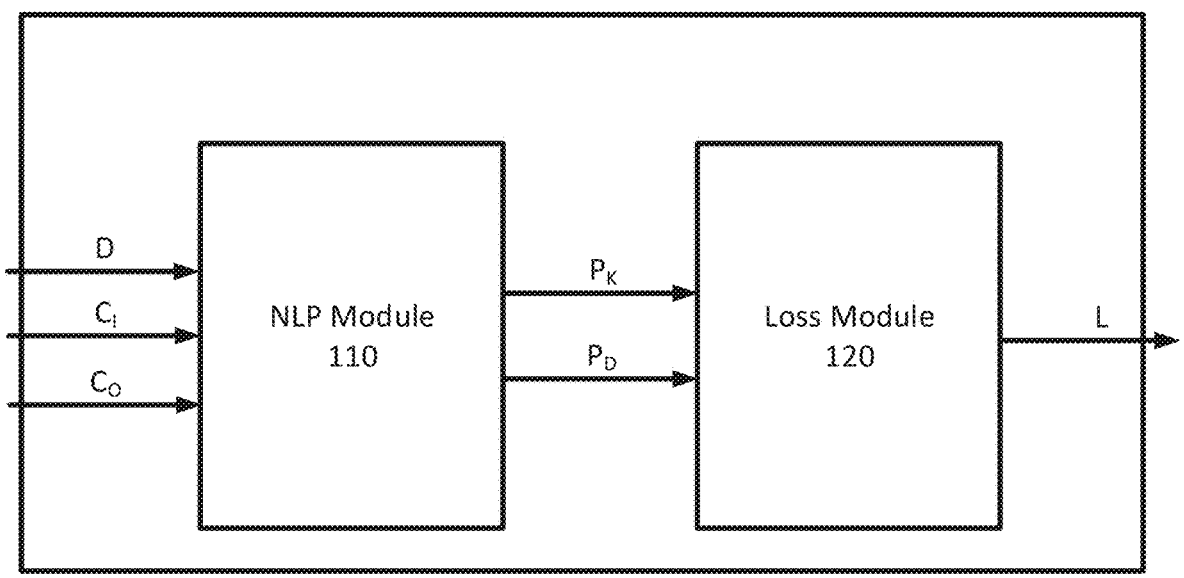
FIG. 1 is a simplified structural diagram of a system for training a NLP classifier, according to some embodiments described herein.

In the figures and appendices, elements having the same designations have the same or similar functions.

DETAILED DESCRIPTION

A large amount of scientific and technical articles are published every year, imposing a need for researchers to actively review and come up to speed on the state of the art in their respective field. Thus, literature review alone, in research and development, can be costly and time-consuming.

Existing summarization systems generally adopt a universal method to generate a summary of an input document, which can often be oblivious of user preference, or the nature of the input document. However, such summarization systems may not generate an accurate summary for highly scientific or technical documents, as such documents may often have a particular type of passage, usage of technical lexicon, and/or specific user audience. For example, when the same methodology is applied to generate a summary of a news article on a new movie release, and a summary of a scientific publication in Nature, the resulting summaries may not cater to the different preferences in vocabulary, content, and/or the like of the different user audience for the summaries.

For another example, scientific or technical publications usually cite prior publications, or are cited by later publications. These citations provide indications on the research history and/or relevance of the content of the scientific or technical publications. Specifically, some commercial database, such as GOOGLE® Citation, provide citation data of a research paper, e.g., references that the research papers cited (e.g., outbound citation of the research paper), and other papers that have cited the research paper as reference (e.g., inbound citation of the research paper).

In view of the need to grasp large amounts of scientific literature, the invention provides an auto-summarization system that provides a customized summarization of scientific or technical articles, which disentangles background information from new contributions, and summarizes the background information or the new information (or both) based on a user's preference. Specifically, the systems and methods described herein utilize machine learning classifiers to classify portions of sentences within the article as containing background information or as containing a new contribution attributable to the article. The systems and methods then incorporate the background information in the summary or incorporate the new contribution in the summary and output the summary. In this way, the summarization system can provide summaries of scientific literatures, which largely accelerates literature review in scientific fields.

As used herein, the term "or" shall convey both disjunctive and conjunctive meanings. For example, the phrase "A or B" may be interpreted to include element A alone, element B alone, or and the combination of elements A and B.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "nonfiction article" refers to any text document whose content is not fictional. For example, the "nonfiction article" can be a scientific research paper, a technical white paper, a patent document, and/or the like.

As used herein, the term "inbound citation" of a nonfiction article refers to a publication that is published later than the nonfiction article and cites the nonfiction article as a reference.

As used herein, the term "outbound citation" of a nonfiction article refers to a publication that is published earlier than the nonfiction article, which is cited by the nonfiction article as a reference.

FIG. 1 is a simplified structural diagram of a system 100 for training a NLP classifier, according to some embodiments. As shown in FIG. 1, the system may comprise a NLP module 110 and a loss module 120.

Figure 3:
FIG. 3 is a simplified logic flow diagram illustrating a method for training a NLP classifier, according to some embodiments described herein.

The NLP module 110 may be configured to perform one or more of operations 310, 320, and 330 described herein or with respect to FIG. 3. For example, as shown in FIG. 1, the NLP module may be configured to receive one or more portions D of a nonfiction article. The nonfiction article may comprise a scientific or technical article. Each portion may comprise a plurality of text segments. Each portion may be associated with citation information. The citation information may comprise one or more inbound citations $C_I$ that post-date the nonfiction article. The inbound citations may comprise articles that cite to the nonfiction article. The citation information may comprise one or more outbound citations $C_O$ that pre-date the nonfiction article. The outbound citations may comprise articles to which the nonfiction article cites. The citation information may comprise a combination of inbound citations and outbound citations. For example, citation database, such as GOOGLE® Citation, may provide the citation information.

For each text segment of the plurality of text segments, the NLP module may be configured to determine whether the text segment contains background information, a new contribution, or both. The NLP module may be configured to determine that a first part of the text segment is background information. For example, the NLP module may be configured to determine that the first part is background information by detecting one or more outbound citations associated with the text segment. Such a configuration may be referred to herein as a background information mode. The NLP module may be configured to determine that a second part of the text segment is a new contribution attributable to the nonfiction article. For example, the NLP module may be configured to determine that the second part is a new contribution by detecting one or more inbound citations associated with the text segment. Such a configuration may be referred to herein as a new contribution mode. The NLP module may be configured to determine that the first part is background information and that the second part is a new contribution.

Background information may be defined as anything known prior to the publication of the nonfiction article, and may comprise a description of the problem embraced by the nonfiction article or previous work on the topic of the nonfiction article or in the general field of knowledge to which the nonfiction article belongs. A new contribution may be defined as anything introduced by the nonfiction article that was unknown prior to the publication of the nonfiction article, and may comprise new methods, new theories, or new resources.

During training of the NLP module, each text segment may be associated with a control code associated with a desired output. For example, text segments containing background information may be associated with the control code "context" or "ctx". Text segments containing a new contribution may be associated with the control code "contribution" or "con." The NLP module may thus be configured as a ControlCode (CC) NLP module.

Figure 2:
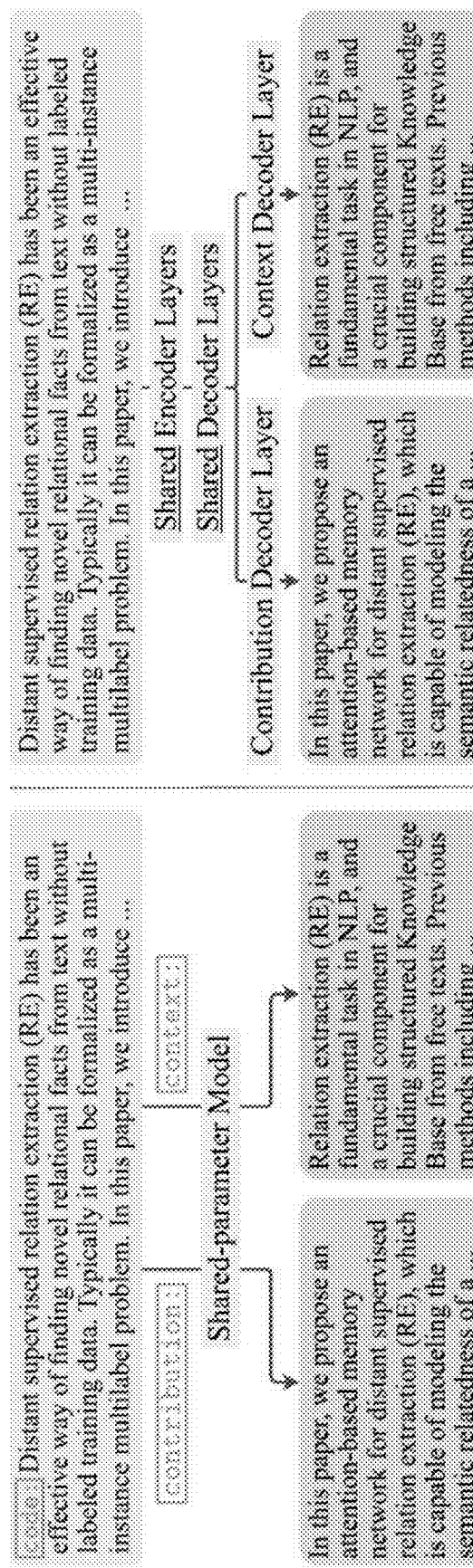
FIG. 2 shows a diagram of ControlCode (CC) and MultiHead (MH) approaches to training an NLP classifier, according to some embodiments described herein.

Alternatively or in combination, the NLP module may comprise one or more neural layers that are specifically allocated for the control aspects described above. In such a configuration, encoder layers of the NLP module may share parameters between the background information mode and the new contribution mode. However, in such a configuration, only hidden decoder layers of the NLP module may share all parameters, while the output layer may split into separate branches for the background information mode and the new contribution mode. The NLP module may thus be configured as a MultiHead (MH) NLP module. FIG. 2 shows a diagram of the CC and MH approaches to training.

Returning to the description of FIG. 1, the loss module may be configured to perform operation 340 described herein with respect to FIG. 3. For example, as shown in FIG. 1, the loss module may be configured to compute a loss objective L. The loss objective may be computed based on a first conditional probability distribution of a background conditioned on the outbound citation information, and/or a second conditional probability distribution of a summary on the inbound citation information.

For example, the loss objective may be formulated in terms of an informativeness criterion. Informativeness Inf may measure a user's degree of surprise after reading a summary given their background knowledge and may be defined as:

$$\text{Inf} = -\Sigma_i P_D(\omega_i) \log P_K(\omega_i) \quad (1)$$

Here, the sum may be taken over all semantic units $\omega_i$ contained within a text segment of the plurality of text segments, $P_K$ may be the likelihood of the summary given previous work, and $P_D$ may be the likelihood of the summary given the contents of the nonfiction article. In some embodiments, the semantic units may comprise the summary itself. In some embodiments, the semantic units may comprise primitive semantic units within the summary. Inf may attempt to quantify the intuition that new contributions may cause surprise given prior general knowledge about the state of a field. Inf may be further refined based on whether the NLP is operating in the background information mode or the new contribution mode:

$$\text{Inf} = \begin{cases} -p(y_{con}|D)\log y_{con}|C_O, & \text{new contribution mode} \\ -p(y_{ctx}|D)\log y_{ctx}|C_I, & \text{background mode} \end{cases} \quad (2)$$

Here, $y_{con}$ is the new contribution of the article and $y_{ctx}$ is the context or background of the article. The loss objective may be combined with a cross entropy loss objective $L_{CE}$:

$$L = L_{CE} - \lambda \text{Inf} \quad (3)$$

Here, $\lambda$ is a scaling hyperparameter and may be determined via cross-validation.

The system may further comprise a backpropagation module (not shown in FIG. 1). The backpropagation module may be configured to update the NLP module via backpropagation.

The system may further comprise an output module (not shown in FIG. 1). The output module may be configured to include the first part in a background file. The output module may be configured to include the second part in a contribution file. The output module may be configured to include the first part in the background file and the second part in the contribution file. The output module may be configured to generate the summary based on at least a portion of the background file. The output module may be configured to generate the summary based on at least a portion of the contribution file. The output module may be configured to generate the summary based on at least a portion of the background file and at least a portion of the contribution file. The output module may be configured to output the summary.

FIG. 3 is a simplified logic flow diagram illustrating a method 300 for training a NLP classifier, according to some embodiments.

At operation 310, the method may comprise receiving one or more portions of a nonfiction article, as described herein with respect to FIG. 1. The one or more portions may comprise a plurality of text segments, as described herein with respect to FIG. 1. The one or more portions may be associated with citation information, as described herein with respect to FIG. 1. The citation information may comprise one or more inbound citations, one or more outbound citations, or a combination thereof, as described herein with respect to FIG. 1.

At operation 320, the method may comprise inputting the portion of the nonfiction article and the citation information to a NLP model, as described herein with respect to FIG. 1.

At operation 330, the method may comprise, for each text segment of the plurality of text segments: (i) determining that a first part of the text segment is background information; (ii) determining that a second part of the text segment is a new contribution attributable to the nonfiction article; or (iii) any combination thereof, as described herein with respect to FIG. 1. The first part of the text segment may be determined to be background information by detecting an outbound citation associated with the text segment, as described herein with respect to FIG. 1. The second part of the text segment may be determined to be a new contribution by detecting an inbound citation associated with the text segment, as described herein with respect to FIG. 1.

At operation 340, the method may comprise computing a loss objective based at least in part on: (i) a first conditional probability distribution of the background information; (ii) a second conditional probability distribution of the new contribution; or (iii) any combination thereof, as described herein with respect to FIG. 1. The first conditional probability distribution may be conditioned on given information of the one or more outbound citations, as described herein with respect to FIG. 1. The second conditional probability distribution may be conditioned on given information of the one or more inbound citations, as described herein with respect to FIG. 1.

At operation 350, the method may comprise updating the NLP model using the loss objective via backpropagation, as described herein with respect to FIG. 1.

The method may further comprise: (i) including the first part in a background file; (ii) including the second part in a contribution file; or (iii) any combination thereof, as described herein with respect to FIG. 1. The method may further comprise generating the summary based upon: (i) at least a portion of the background file; (ii) at least a portion of the contribution file; or (iii) any combination thereof, as described herein with respect to FIG. 1. The method may further comprise outputting the summary.

Figure 4:
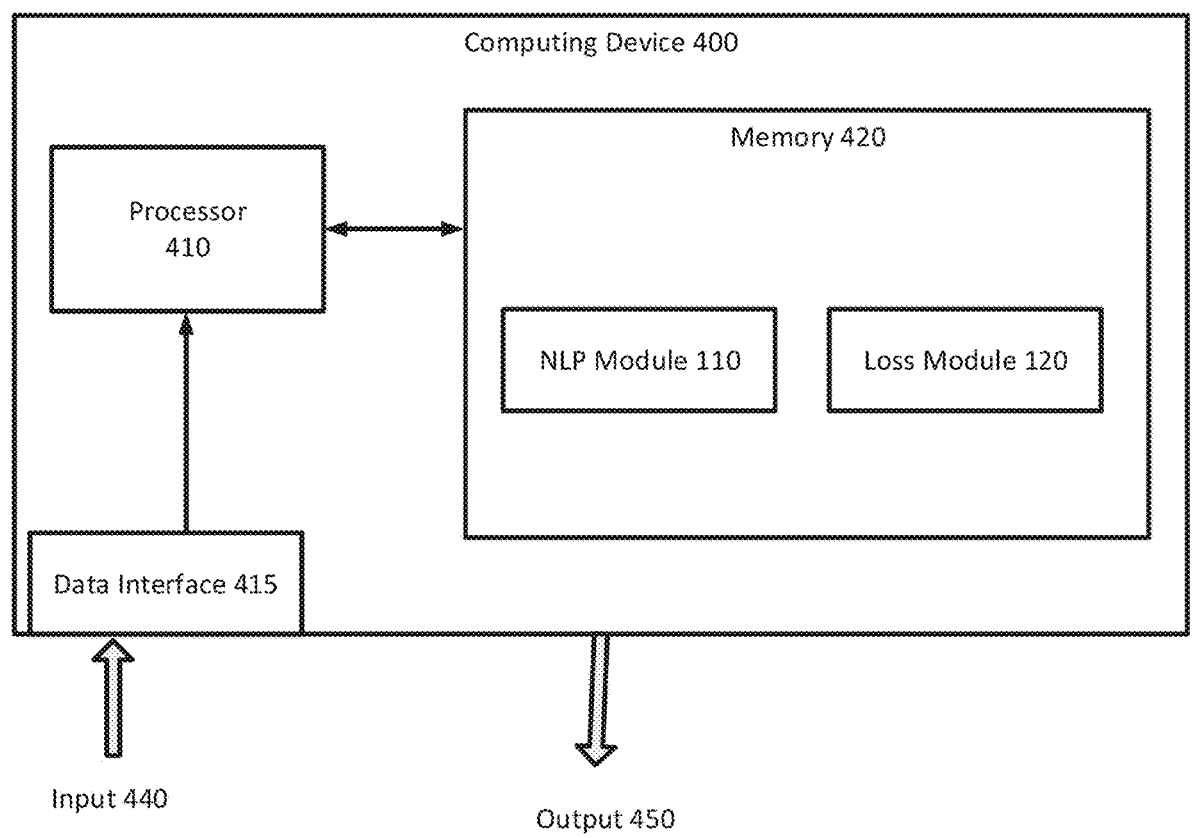
FIG. 4 is a simplified diagram of a computing device for training a NLP classifier, according to some embodiments described herein.

FIG. 4 is a simplified diagram of a computing device for training a NLP classifier, according to some embodiments. As shown in FIG. 4, computing device 400 includes a processor 410 coupled to memory 420. Operation of computing device 400 is controlled by processor 410. Although computing device 400 is shown with only one processor 410, it is understood that processor 410 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 400. Computing device 400 may be implemented as a stand-alone subsystem, as a board added to a computing device, and/or as a virtual machine.

Memory 420 may be used to store software executed by computing device 400 and/or one or more data structures used during operation of computing device 400. Memory 420 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 410 and/or memory 420 may be arranged in any suitable physical arrangement. In some embodiments, processor 410 and/or memory 420 may be implemented on a same board, in a same package (e.g., system-in-package), on a same chip (e.g., system-on-chip), and/or the like. In some embodiments, processor 410 and/or memory 420 may include distributed, virtualized, and/or containerized computing resources. Consistent with such embodiments, processor 410 and/or memory 420 may be located in one or more data centers and/or cloud computing facilities.

In some examples, memory 420 may include non-transitory, tangible, machine readable media that includes executable code that when run by one or more processors (e.g., processor 410) may cause the one or more processors to perform the methods described in further detail herein (such as method 300 described herein with respect to FIG. 3). For example, as shown, memory 420 includes instructions for NLP module 110 that may be used to implement and/or emulate the systems and models, and/or to implement any of the methods described further herein. In some examples, the NLP module 110, may receive an input 440, e.g., such as a textual document of a nonfiction article, via a data interface 415. The data interface 415 may be any of a user interface that receives an input nonfiction article from a user, or a communication interface that may receive or retrieve aa training sample of a nonfiction article from a database. The NLP module 110 may in turn generates an output 450, e.g., a summary of the input.

In some embodiments, the memory 420 includes a loss module 120, a backpropagation module, or an output module. The NLP module, loss module, backpropagation module, and output module are configured to perform operations of the method 300 described herein to the input to train an NLP classifier, as described herein.

Some examples of computing devices, such as computing device 400 may include non-transitory, tangible, machine readable media that include executable code that when run by one or more processors (e.g., processor 310) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

EXAMPLES

Example 1: Experimental Methods and Results

A new large-scale dataset was introduced by extending the S2ORC (K. Lo et al, "S2ORC: The semantic scholar open research corpus," in *Proceedings of the 58th Annual Meeting of the Association for Computational Linguistics*, pp. 4969-4983 (2020), doi: 10.18653/v1/2020.acl-main.447, which is herein incorporated by reference in its entirety for all purposes) corpus of scientific papers, which spans multiple scientific domains and offers rich citation-related metadata. The data were organized, processed, and extended with automatically generated contribution and context reference summaries to enable supervised model training. Three abstractive baseline approaches were utilized: 1) a unified, controllable model manipulated with descriptive control codes, 2) a one-to-many sequence model with a branched decoder for multi-head generation, and 3) an information theoretic training strategy leveraging supervision coming from the citation metadata. To benchmark the models, a comprehensive automatic evaluation protocol was designed that measured performance across three axes: relevance, novelty, and disentanglement. The baselines models were thoroughly evaluated and analyzed and the effects of the additional training objective on the model's behavior were investigated. To motivate the usefulness of the newly introduced task, a human study involving human annotators in a hypothetical paper-reviewing setting was conducted. The results found disentangled summaries more helpful in 79% of cases in comparison to abstract-oriented outputs. Code, model checkpoints, and data preparation scripts introduced in this work are available at https://github.com/salesforce/disentangled-sum.

Current benchmark datasets used for the task of scientific paper summarization, such as arXiv and PubMed, are limited in size, the number of domains, and lack of citation metadata. Thus, a new dataset based on the S2ORC corpus was constructed. The S2ORC corpus offers a large collection of scientific papers spanning multiple domains along with rich citation related metadata, such as citation links between papers and annotated citation spans. The data available in the S2ORC corpus was carefully curated and extended with new reference labels. Some papers in the S2ORC corpus do not contain a complete set of information (paper text, abstract, and citation metadata) utilized by the systems and methods utilized herein. Such instances were removed and a paper summarization dataset was constructed in which each example a) had an abstract and body text, and b) had at least 5 or more inbound and outbound citations. In cases where a paper had more than 20 incoming or outgoing citations, the citations were sorted descending order by the number of their respective citations and the top 20 most relevant articles were kept.

Each article in the set of inbound and outbound citations can be represented by its full text, abstract, or the span of text associated with the citation. Citations were represented with the sentences in which they occurred. Thus, an outbound citation was represented by a sentence from the source paper. Usually, such sentences directly referred to the cited paper and placed its content in relation to the source paper. Analogously, an inbound citation was represented by sentences from the citing paper and related its content with the source paper.

The systems and methods described herein rely on the availability of reference summaries for both contributions and contexts. However, such annotations were not provided or easily extractable from the S2ORC corpus, and collecting expert annotations was infeasible due to the associated costs. Therefore, a data-driven approach was applied to automatically extract contribution and context reference summaries from the available paper abstracts. 400 abstracts sampled from the training set were manually labeled. Annotations were done on a sentence-level with binary labels indicating contribution- and context-related sentences. This procedure yielded 3341 sentences with associated binary labels, referred to as golden standard references. Next, an automatic sentence classifier was fine-tuned using the golden standard data. SciBERT (I. Beltagy et al, "SciBERT: A pretrained model for scientific text," in *Proceedings of the 2019 Conference on Empirical Methods in Natural Language Processing and the 9th International Joint Conference on Natural Language Processing*, pp. 3615-3620 (2019), doi: 10.18653/v1/D19-1371, which is herein incorporated by reference in its entirety for all purposes) was used as the classifier, which after fine-tuning achieved 86.3% accuracy in classifying contribution and context sentences on a held-out test set. Finally, the fine-tuned classifier was applied to generate reference labels for all examples in the dataset, which are referred to as silver standard references. Statistics of the resulting dataset are shown in Table 1.

TABLE 1

Token length statistics on the training split of the dataset compared to existing scientific paper summarization datasets. Contribution summaries tend to be shorter than context summaries.

| Dataset | # Examples | D | $C_I$ | $C_O$ | $y_{con}$ | $y_{ctx}$ |
|---|---|---|---|---|---|---|
| ArXiv (train) | 203037 | 4938 | — | — | 220 (total summary) | |
| PubMed (train) | 119924 | 3016 | — | — | 203 (total summary) | |
| Train | 805152 | 6351 | 925 | 877 | 136 | 236 |
| Valid | 36129 | 6374 | 922 | 875 | 135 | 236 |
| Test | 54242 | 6350 | 927 | 892 | 136 | 237 |

For the ControlCode (CC) approach, training instances were modified by prepending textual control codes "contribution:" or "context:" to the summarized articles. During training, all model parameters were updated for each data instance and the model was expected to learn to associate the provided prompt with the correct output mode. The approach did not require changes in the architecture, making it straightforward to combine with existing large-scale, pre-trained models. For the MultiHead (MH) approach, each branch was individually updated with gradients from the associated mode during. The model shared the softmax layer weights between the output branches under the assumption that token-level vocabulary distributions were similar in the two generation modes due to the common domain. The use of informativeness as an auxiliary measure that is optimized during training was also explored.

Figure 5:
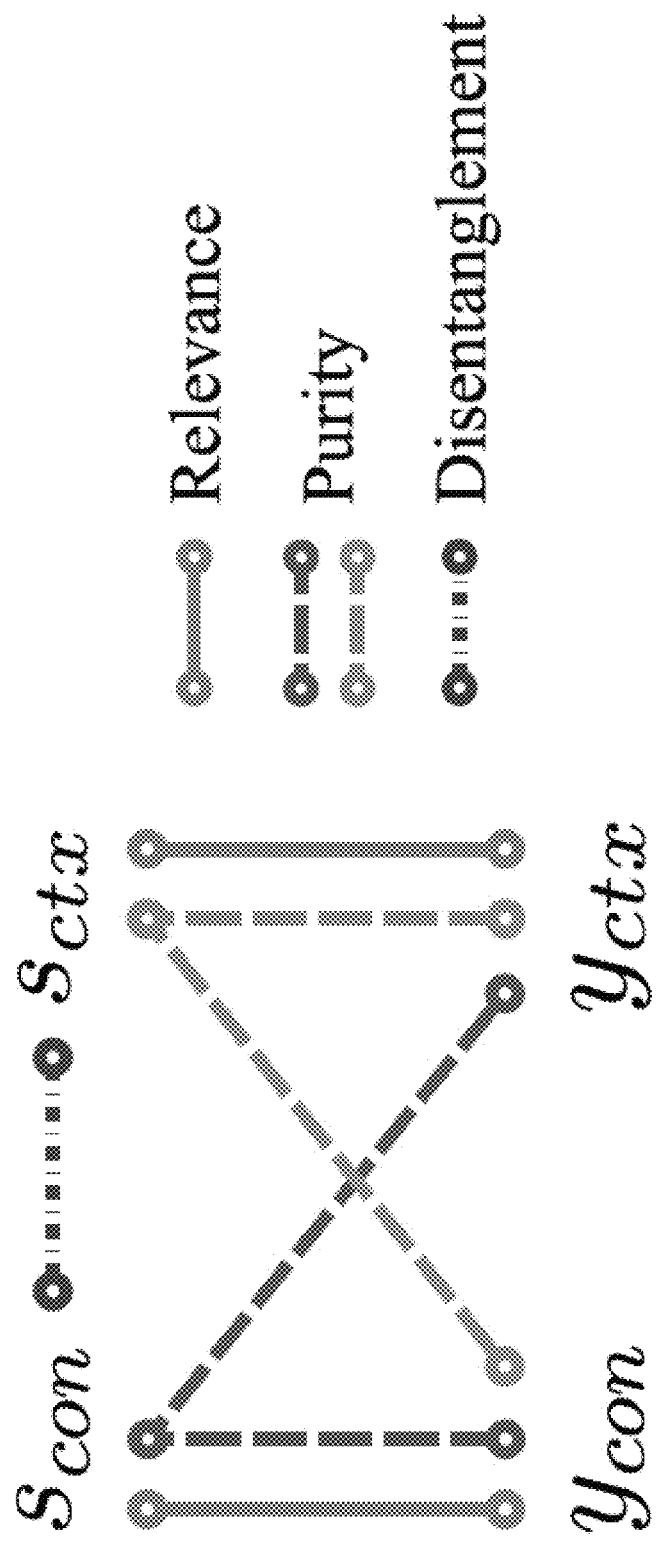
FIG. 5 shows results of a comprehensive evaluation protocol, according to some embodiments described herein.

Automatic evaluation of the system outputs ($s_{con}$, $s_{ctx}$) was performed against the silver standard references ($y_{ctx}$, $y_{ctx}$). For this purpose, a comprehensive evaluation protocol, shown in FIG. 5, was designed based on metrics that evaluate the performance of models across 3 dimensions: relevance, purity, and disentanglement. Relevance tracks the notion that generated summaries should closely correspond with the available reference summaries. The lexical overlap and semantic similarity between ($s_{con}$, $y_{con}$) and ($s_{ctx}$, $y_{ctx}$) were measured using ROUGE (R–i) (C. Lin, "ROUGE: A package for automatic evaluation of summaries," in *Text Summarization Branches Out*, pp. 74-81 (2004), which is herein incorporated by reference in its entirety for all purposes) and BERTScore BS (T. Zhang et al, "Bertscore: Evaluating text generation with bert," in *International Conference on Learning Representations* (2020), which is herein incorporated by reference in its entirety for all purposes), respectively. Purity tracks the notion that a generated contribution summary should closely correspond with its respective reference summary, but should not overlap with the context reference summary. The lexical overlap between $s_{con}$ and ($y_{con}$, $y_{ctx}$) was measured using NouveauROUGE con (Ncon–i) (J. M. Conroy et al, "Nouveau-ROUGE: A novelty metric for update summarization," *Computational Linguistics*, 37(1), 1-8 (2011), doi: 10.1162/coli_a_00033, which is herein incorporated by reference in its entirety for all purposes). The metric reported an aggregate score defined as a linear combination between the two components: NouveauROUGE$_{con}$–i=$\alpha_0^i$+$\alpha_1^i$ROUGE–i($s_{con}$, $y_{con}$)+$\alpha_2^i$ ROUGE–i($s_{ctx}$, $y_{ctx}$) where weights $\alpha_j^i$ were set by the original authors to favor outputs with maximal and minimal overlap with related and unrelated references, accordingly. Analogously, N$_{ctx}$–i was calculated in reverse direction between $s_{ctx}$ and ($y_{ctx}$, $y_{con}$). Purity P–i was defined as the average novelty in both directions: P–i=(N$_{con}$–i+N$_{ctx}$–i)/2. Disentanglement tracks the notion that generated contribution and context summaries should have minimal overlap. The degree of lexical overlap and semantic similarity between ($s_{con}$, $s_{ctx}$) was measured using ROUGE and BERTScore, respectively. To maintain consistency across metrics (higher is better), disentanglement scores are reported as complements of the associated metrics: DisROUGE–i=100–ROUGE–i and DisBERTScore=100–BERTScore.

The models built upon distilBART (V. Sanh et al, "Distilbert, a distilled version of BERT: smaller, faster, cheaper and lights," *CoRR*, abs/1910.01108 (2019), which is herein incorporated by reference in its entirety for all purposes), a Transformer-based (A. Vaswani et al, "Attention is all you need," *CoRR*, abs/1706.03762 (2017), which is herein incorporated by reference in its entirety for all purposes), pre-trained sequence-to-sequence architecture distilled from BART (M. Lewis et al, "BART: Denoising sequence-to-sequence pre-training for natural language generation, translation, and comprehension," in *Proceedings of the 58th Annual Meeting of the Association for Computational Linguistics*," pp. 7871-7880 (2020), doi: 10.18653/v1/2020.acl-main.703, which is herein incorporated by reference in its entirety for all purposes). Specifically, a model with 6 self-attention layers in both the Encoder and Decoder was utilized. Weights were initialized from a model fine-tuned on a news summarization task. For the MH model, the final layer of the decoder was duplicated and initialized with identical weights. Fine-tuning was conducted on the training set for 80000 gradient steps with a fixed learning rate of $3.0 \times 10^{-5}$ and the best checkpoints were chosen in terms of ROUGE-1 scores on the validation set. The loss scaling hyperparameter $\lambda$ was set to 0.05 and 0.01 for the CC and MH models, accordingly. Input and output lengths were set to 1024 and 200, respectively. At inference time, decoding was performed using beam search with beam size 5. The evaluation was performed using the SummEval toolkit (A. R. Fabbri et al, "Summeval: Re-evaluating summarization evaluation," arXiv: 2007.12626 (2020), which is herein incorporated by reference in its entirety for all purposes). Table 2 shows results from the automatic evaluation protocol.

TABLE 2

Automatic evaluation results on the test set. For all metrics, higher values indicate better results. Con and Ctx refer to contribution summary and context summary, respectively. Purity and Disentanglement were measured on the pairs of contribution and context summaries.

| Model | | Relevance | | | | Purity | | Disentanglement | | | |
|---|---|---|---|---|---|---|---|---|---|---|---|
| | | R-1 | R-2 | R-L | BS | P-1 | P-2 | D-1 | D-2 | D-L | DBS |
| CC | Con | 39.16 | 15.96 | 24.65 | 63.22 | 2.77 | 3.69 | 52.95 | 72.18 | 69.12 | 33.62 |
| | Ctx | 41.84 | 17.24 | 24.55 | 63.78 | | | | | | |
| CC+ Inf | Con | 38.92 | 15.95 | 24.65 | 62.94 | 2.75 | 3.68 | 53.68 | 71.97 | 68.46 | 34.09 |
| | Ctx | 41.49 | 17.03 | 24.50 | 63.40 | | | | | | |
| MH | Con | 39.20 | 15.98 | 24.72 | 63.04 | 2.73 | 3.68 | 50.89 | 69.51 | 65.97 | 32.51 |
| | Ctx | 41.67 | 17.23 | 24.65 | 63.77 | | | | | | |
| MH+ Inf | Con | 38.74 | 15.90 | 24.59 | 62.70 | 2.68 | 3.60 | 53.35 | 71.47 | 67.20 | 33.86 |
| | Ctx | 40.39 | 16.31 | 23.83 | 62.85 | | | | | | |

Relevance: Across most models and metrics, relevance scores for context generation were higher than those for contribution summarization. Manual inspection revealed that in some cases generated context summaries also include article contribution information, while this effect was not observed in the reverse situation. Considering that silver standard annotations may contain noisy examples with incorrectly separated references, higher ROUGE scores for context summaries may be caused by noisy predictions coinciding with noisy references. Examples of such summaries are shown in the Appendix E. Informativeness-guided models (CC+Inf and MH+Inf) performed on par with their respective base versions, and the additional training objective did not affect the performance on the relevance metric.

Purity: While the informativeness objective was designed to improve the novelty of generated summaries, results showed an opposite effect, where informativeness-guided models slightly underperformed their base counterparts. The true reason for such behavior is unknown, though it might be an indicator that the outbound citations CO were not a good approximation of reference context summaries yctx, or the relationship between the two is weak. This effect was more evident in the Medical and Biology domains, which were the two most frequent domains in the dataset.

Disentanglement: Results indicate that CC-based models perform better than MH-based approaches in terms of generating disentangled outputs. This comes as a surprise given that the CC models shared all parameters between the two generation modes, but might indicate that the two tasks contained complementary training signals. Both informativeness-guided models performed better in terms of D–1.

Based on both purity and disentanglement evaluations, it may be that the informativeness objective does guide the models to output more disentangled summaries, but that the signal was not strong enough to focus on generating the appropriate content. It is also clear that the MH model benefitted more from the additional training objective.

To better understand the strengths and shortcomings of our models, a qualitative study of model outputs was performed. Table 3 shows an example of generated summaries compared with the original abstract of the summarized article. The model successfully separated the two generation modes and output coherent and easy to follow summaries. The contribution summary clearly listed the novelties of the work, while the context summary introduced the task at hand and explained its importance. In comparison, the original abstract briefly touched on many aspects: the context, methods used, and contributions, but also offered details that were not of primary importance, such as the detailed about the simulation environment. More generally, the described trends held across summaries generated by the models. The model outputs were fluent, abstractive, offered good separation between modes, and were on topic. However, the factual correctness of summaries could not be assessed due to the highly specialized content and language of the summarized articles. An artifact noticed in a few instances of the inspected outputs was leakage of contribution information into context summaries. Other examples of generated summaries are included in the Appendix E.

Table 3: Generated samples compared with the original and generated abstracts of the associated paper. The second rows shows the output decoded from DistilBART fine-tuned on the dataset, the third rows shows the outputs from CC model. The model successfully generated disentangled content, thus making it easier to follow than the abstract.

Original Abstract: Energy optimization in buildings by controlling the Heating Ventilation and Air Conditioning (HVAC) system is being researched extensively. In this paper, a model-free actor-critic Reinforcement Learning (RL) controller is designed using a variant of artificial recurrent neural networks called Long-Short-Term Memory (LSTM) networks. Optimization of thermal comfort alongside energy consumption is the goal in tuning this RL controller. The test platform, our office space, is designed using SketchUp. Using OpenStudio, the HVAC system is installed in the office. The control schemes (ideal thermal comfort, a traditional control and the RL control) are implemented in MATLAB. Using the Building Control Virtual Test Bed (BCVTB), the control of the thermostat schedule during each sample time is implemented for the office in EnergyPlus alongside local weather data. Results from training and validation indicate that the RL controller improves thermal comfort by an average of 15% and energy efficiency by an average of 2.5% as compared to other strategies mentioned.

Generated Abstract: Despite the advances in research on HVAC control algorithms, most field equipment is controlled using classical methods that include hysteresis/on/off and Proportional Integral and Derivative (PID) controllers. These classical methods do not perform optimally. The high thermal inertia of buildings induces large time delays in the building dynamics, which cannot be handled efficiently by the simple on/off controllers. However, due to the high non-linearity in building dynamics coupled with uncertainties such as weather, energy pricing, etc., these PID controllers require extensive retuning or auto-tuning capabilities, which increases the difficulty and complexity of the control problem. In this work, we introduce novel control algorithms from a branch of machine learning called reinforcement learning. From a controls perspective, reinforcement learning algorithms can be considered as direct adaptive optimal control Like optimal control, reinforcement training algorithms minimize the cumulative sum of costs over a time horizon. Unlike traditional optimization algorithms can learn optimal control actions.

Contribution: In this work, we introduce novel control algorithms from a branch of machine learning called reinforcement learning. In our current approach, the impetus is thermostat control. Instead of traditional on/off heating and cooling control, reinforcement learning is utilized to set this schedule to obtain improved Predicted Mean Vote (PMV)-based thermal comfort at an optimal energy expenditure. Hence, a thermostats schedule is computed using an RL controller. The results show that the Q-learning algorithm can learn to adapt to time-varying and nonlinear system dynamics without explicit identification of the plant model in both systems and controls.

Context: The Heating, Ventilation and Air Conditioning (HVAC) systems can account for up to 50% of total building energy demand. In the hopes of moving toward a greener, more energy-efficient future, a significant improvement in energy efficiency is needed to achieve this goal. Despite the advances in research on HVAC control algorithms, most field equipment is controlled using classical methods that include hysteresis/on/off and Proportional Integral and Derivative controllers. However, due to the high nonlinearity in building dynamics coupled with uncertainties such as weather, energy pricing, etc., these PID controllers require extensive retuning or auto-tuning capabilities, which increases the difficulty and complexity of the control problem. The high thermal inertia of buildings induces large time delays in the building dynamics, which cannot be handled efficiently by the simple on/off controllers.

Taking advantage of the rich metadata associated with the S2ORC corpus, the performance of models across the 10 most frequent scientific domains was analyzed. Table 4 shows the results of contribution summarization using the CC model. While ROUGE–1 scores oscillate around 40 points for most academic fields, the results indicate that summarizing documents from the Medical domain was particularly difficult, with models scoring about 7 points below average.

TABLE 4

Relevance evaluation of contribution summaries for the top 10 domains generated using the CC model. Performance on Medicine domain is particularly low.

| Metric | R-1 | R-2 | R-L | BS |
|---|---|---|---|---|
| Biology | 40.63 | 17.01 | 25.59 | 64.23 |
| Medicine | 33.97 | 13.08 | 21.73 | 61.75 |
| Mathematics | 40.13 | 15.56 | 24.42 | 61.58 |
| Computer science | 43.54 | 16.41 | 25.86 | 63.43 |
| None | 40.31 | 18.14 | 26.68 | 64.00 |
| Psychology | 39.51 | 15.56 | 24.34 | 62.95 |

TABLE 4-continued

Relevance evaluation of contribution summaries for the top 10 domains generated using the CC model. Performance on Medicine domain is particularly low.

| Metric | R-1 | R-2 | R-L | BS |
|---|---|---|---|---|
| Physics | 40.09 | 15.85 | 24.89 | 62.10 |
| Chemistry | 40.44 | 17.77 | 26.14 | 63.93 |
| Economics | 39.56 | 14.25 | 23.41 | 60.91 |
| Materials science | 42.52 | 18.96 | 27.57 | 65.25 |

Manual inspection of instances with low scores (R–1<20), exposed that contribution summaries in the Medical domain are highly quantitative (e.g. "Among these treated . . . retinopathy was noted in X %"). While other domains such as Biology also suffer from the same phenomenon, low-scoring quantitative summaries were 1.9 times more frequent in Medicine than in Biology. An investigation into the domain distribution in the dataset (Appendix) revealed that Biology and Medicine were the two best represented fields in the corpus, with Biology having over twice as many examples. Poor performance of the models may stem from the fact that generating such quantitative summaries requires a deeper, domain-specific understanding of the source document and the available in-domain training data was insufficient to achieve that goal.

To assess the usefulness of the newly introduced task to the research community, a human study involving expert annotators was conducted. The study aimed to compare disentangled papers summaries with traditional, abstract-based summaries in a hypothetical paper reviewing setting. Judges were shown both types of summaries side by side and asked to pick one which would be more helpful for conducting the paper review. Abstract-based summaries were generated by a model with a configuration identical to the models previously introduced herein, trained to generate full abstracts using the same training corpus. Annotators that participated in this study held graduate degrees in technical fields and were active in the research community. However, they were not involved or familiar with this work prior to these experiments.

The study used 100 examples, out of which 50 were decoded on the test split of the adapted S2ORC dataset, while the other 50 were generated in a zero-shot fashion from articles in the CORD dataset (Wang et al., 2020), a recently introduced collection of papers related to COVID-19. Results in Table 5 show the proportion of all examples where the annotators preferred the disentangled summaries over the generated abstracts. The numbers indicate a strong preference from the judges for disentangled summaries, in the case of both S2ORC and CORD examples. The values on CORD samples are slightly higher than those on S2ORC. This may be due to the fact that the annotators were less familiar with the topics described in Covid-related publications and would require more help to review such articles.

TABLE 5

Usefulness of disentangled summaries in percentage, e.g., Annotator 1 (A1) chose the disentangled summaries 82% out of all the samples from S2ORC.

| Dataset | A1 | A2 | A3 | Average |
|---|---|---|---|---|
| S2ORC | 82% | 78% | 70% | 77% |
| CORD | 88% | 76% | 78% | 81% |

Example 2: Contribution Distribution in the Papers

Figure 6:
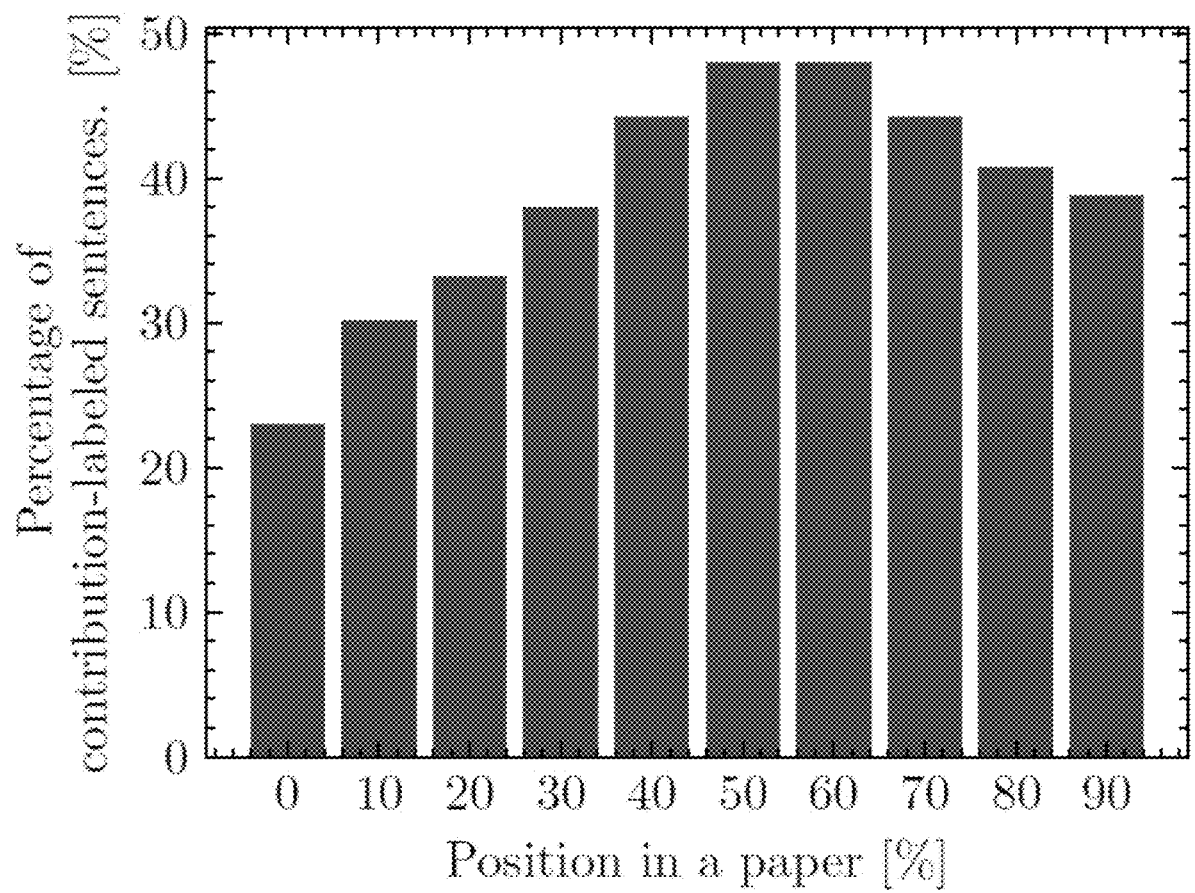
FIG. 6 shows the percentages of sentences grouped into bins according to the relative location of the sentences in the papers they belonged to, according to some embodiments described herein.

Different writing styles might locate and express contributions in different ways. To understand the global tendency of contribution locations in a paper, each sentence was taken from the paper texts themselves in the training set and contributions were annotated using the learned sentence classifier. They were then grouped into 10 bins according to the relative location of the sentences in the papers they belonged to and a distribution was constructed which summarizes the proportion of sentences labeled as contributions in each bin. FIG. 6 shows the percentages of such sentences for each bin. The graph shows that no bin positions in the papers tended to describe contributions more than 50% of the time. Surprisingly, the first 10% of the papers had the lowest chance of describing the contributions, which is counter-intuitive to the general idea that papers tend to discuss the introduction and highlights of the paper at the beginning.

Example 3: Appendix B—Domain Distribution in the Papers

Figure 7:
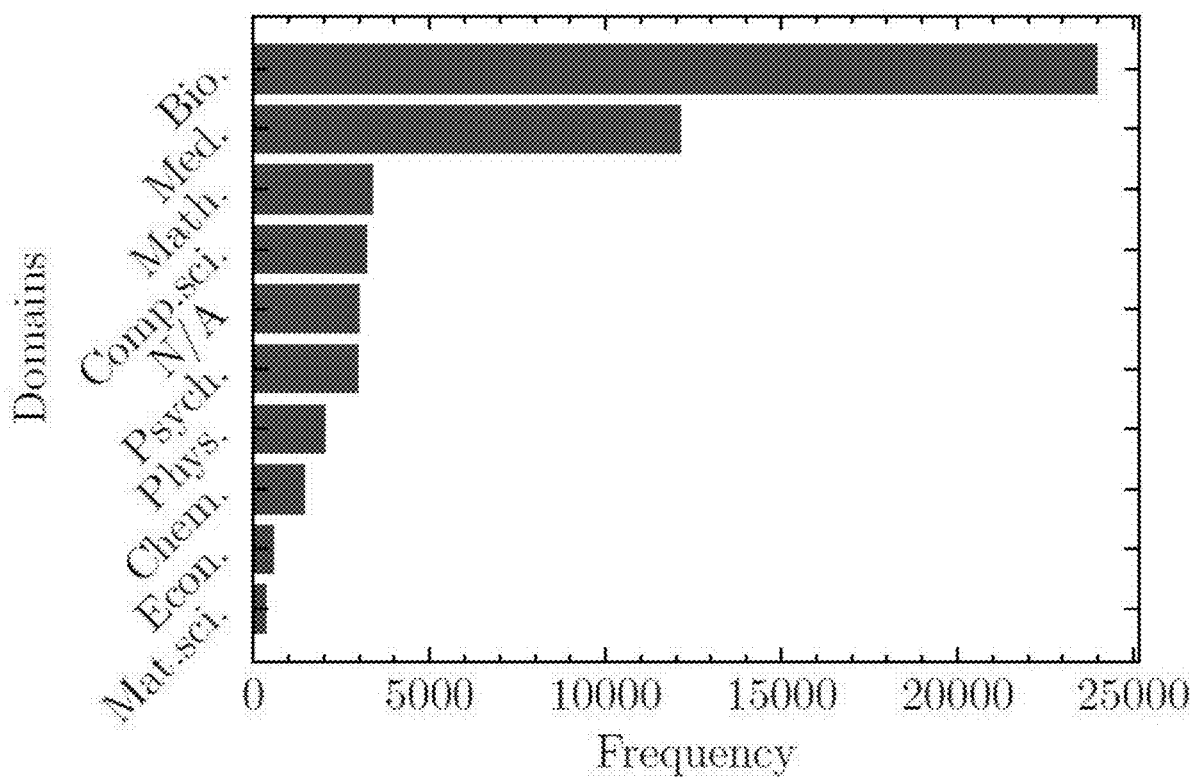
FIG. 7 shows the Top-10 domain distribution of the dataset used herein, according to some embodiments described herein.

The Top-10 domain distribution of the dataset are shown in FIG. 7. Biology and Medicine were the two most dominant domains. The 5th most frequent "domain" were indicated as N/A, meaning that the domain information was not available by S2ORC. Qualitatively, papers in the Biology domain tended to have a similarly formatted summary style to that of Medicine.

Example 4: Evaluation Against Gold Annotations

As discussed herein, labels for contribution or context were populated automatically using a classifier, which was expected to contain mistakes. Therefore, a gold standard evaluation set was created by manually annotating 100 samples in the test set. The evaluation results are reported in Table 6. A sharp drop in ROUGE scores for the context summaries was due to some examples receiving zero scores for generating context summaries when the manual annotation judged that they were not existent. The overall trend of the CC model outperforming the MH model was still observed in the evaluation. More noticeably, a reverse tendency was observed when the two models were applied with the informativeness objective. The MH model specifically enjoyed significant improvement in terms of novelty and disentanglement.

TABLE 6

Automatic evaluation results on 100 samples from the test set with manual contribution annotations. For all metrics, higher values indicate better results.

| Model | | Relevance | | | | Purity | | Disentanglement | | | |
|---|---|---|---|---|---|---|---|---|---|---|---|
| | | R-1 | R-2 | R-L | BS | P-1 | P-2 | D-1 | D-2 | D-L | DBS |
| CC | Con | 39.37 | 15.86 | 24.73 | 63.28 | 2.30 | 3.22 | 52.81 | 71.52 | 68.36 | 33.05 |
| | Ctx | 30.59 | 11.22 | 19.08 | 55.76 | | | | | | |

TABLE 6-continued

Automatic evaluation results on 100 samples from the test set with manual contribution annotations. For all metrics, higher values indicate better results.

| Model | | Relevance | | | | Purity | | Disentanglement | | | |
|---|---|---|---|---|---|---|---|---|---|---|---|
| | | R-1 | R-2 | R-L | BS | P-1 | P-2 | D-1 | D-2 | D-L | DBS |
| CC+ | Con | 38.38 | 15.21 | 23.47 | 62.59 | 2.17 | 3.10 | 52.49 | 69.64 | 66.60 | 32.76 |
| Inf | Ctx | 30.14 | 11.10 | 19.00 | 55.55 | | | | | | |
| MH | Con | 38.63 | 15.53 | 24.68 | 62.84 | 2.21 | 3.13 | 49.62 | 67.45 | 64.43 | 31.39 |
| | Ctx | 29.82 | 10.61 | 18.51 | 55.24 | | | | | | |
| MH+ | Con | 39.43 | 15.75 | 24.77 | 63.11 | 2.26 | 3.13 | 51.56 | 58.57 | 64.97 | 32.35 |
| Inf | Ctx | 29.14 | 10.25 | 18.48 | 54.92 | | | | | | |

Example 5: Human Evaluation of Disentanglement

In addition to various automatic evaluation, human evaluation was performed on disentanglement to understand which models human annotators prefer. Best-Worst scaling (Kiritchenko & Mohammad, 2017) was used over the 4-tuples of summaries on the 50 random samples from the test set and 3 annotators picked the best and the worst contribution and context summary pairs in terms of disentanglement. The rating in Table 7 shows the percentage a model was chosen as the best minus the percentage a model was chosen as the worst; rating ranges from −1 to 1. A similar trend to automatic disentanglement evaluation was observed here as well in that introducing the informativeness objective significantly improved the MH model, while it conversely affected the CC model.

TABLE 7

Disentanglement using Best-Worst scaling

| Model | Rating |
|---|---|
| CC | 0.027 |
| CC + Inf | 0.020 |
| MH | −0.073 |
| MH + Inf | 0.027 |

Example 6: Generated Full Samples from Different Models

Additional samples generated from the CC model are shown in Table 8.
Table 8: Generated Sample. Context summary has a slight erroneous decoding of contribution information.
Original Abstract: Conventional wisdom holds that model-based planning is a powerful approach to sequential decision-making. It is often very challenging in practice, however, because while a model can be used to evaluate a plan, it does not prescribe how to construct a plan. Here we introduce the Imagination-based Planner, the first model-based, sequential decision-making agent that can learn to construct, evaluate, and execute plans. Before any action, it can perform a variable number of imagination steps, which involve proposing an imagined action and evaluating it with its model-based imagination. All imagined actions and outcomes are aggregated, iteratively, into plan context which conditions future real and imagined actions. The agent can even decide how to imagine: testing out alternative imagined actions, chaining sequences of actions together, or building a more complex imagination tree by navigating flexibly among the previously imagined states using a learned policy. And our agent can learn to plan economically, jointly optimizing for external rewards and computational costs associated with using its imagination. We show that our architecture can learn to solve a challenging continuous control problem, and also learn elaborate planning strategies in a discrete maze-solving task. Our work opens a new direction toward learning the components of a model-based planning system and how to use them.
Generated Abstract: The Imagination-based Planner (IBP) is a model-based agent which learns from experience all aspects of the planning process: how to construct, evaluate, and execute a plan. The IBP learns when to act versus when to imagine, and if imagining, how to select states and actions for aggregating the proposed actions and evaluations into a useful plan. Through training, it effectively develops a planning algorithm tailored to the target problem. The learned algorithm allows it to flexibly explore, and exploit regularities in, the state and action spaces. In two experiments we evaluated a continuous IBP implementation on a challenging continuous control task, and a discrete IBP in a maze-solving problem. A fully learnable plan-based planning agent for continuous control. An agent that learns to construct a plan via model-inspired imagination was trained to perform conditional and adaptive computation, which results in a dynamic computational graph recently [7] trained neural networks trained to
Contribution: In this paper we introduce the Imagination-based Planner (IBP), a model-based planning agent which learns from experience all aspects of the planning process: how to construct, evaluate, and execute a plan. The IBP learns when to act versus when to imagine, and if imagining, how to select states and actions to evaluate which will help minimize its external task loss and internal resource costs. Through training, it effectively develops a planning algorithm tailored to the target problem. In two experiments we evaluated a continuous IBP implementation on a challenging continuous control task, and a discrete IBP in a maze-solving problem.
Context: Model-based planning involves proposing sequences of actions, evaluating them under a model of the world, and refining these proposals to optimize expected rewards. Several key advantages of model-free methods are that models support generalization to states not previously experienced, help express the relationship between present actions and future rewards, and can resolve states which are aliased in value-based approximations. These advantages are especially pronounced in problems with complex and stochastic environmental dynamics, sparse reward, and restricted trial-and-error experience. Yet even with an accurate model, planning is often very challenging because while a model can be used to evaluate a plan, it does not prescribe how to construct a plan. Existing techniques for model based planning are most effective in small-scale problems, often require background knowledge of the domain, and use pre-defined solution strategies. Here we introduce the Imagination-based Planner (IBP), a model-based agent which learns from experience all aspects of the planning.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for generating a summary of a nonfiction article, comprising:
   receiving a portion of the nonfiction article, wherein the portion comprises a plurality of text segments and wherein the portion is associated with citation information including: (i) an inbound citation that post-dates the nonfiction article, (ii) an outbound citation that pre-dates the nonfiction article, or (iii) any combination thereof;
   inputting the portion of the nonfiction article and the citation information associated with the portion to a natural language processing (NLP) model;
   for a text segment of the plurality of text segments in the portion:
   (i) determining, by the NLP model, that a first part of the text segment is background information by detecting an outbound citation associated with the text segment;
   (ii) determining, by the NLP model, that a second part of the text segment is a new contribution attributable to the nonfiction article by detecting an inbound citation associated with the text segment, or
   (iii) any combination thereof;
   computing a loss objective based at least in part on: (i) a first conditional probability distribution of the background information conditioned on given information of the outbound citation; (ii) a second conditional probability distribution of the new contribution conditioned on given information of the inbound citation; or (iii) any combination thereof, wherein the loss objective is computed by a cross-entropy loss of the NLP model minus a weighted version of the informativeness term that is based on the first conditional probability distribution or the second conditional probability distribution depending on a mode of the nonfiction article; and
   updating the NLP model using the loss objective via backpropagation.

2. The method of claim 1, further comprising:
   (i) including the first part in a background file;
   (ii) including the second part in a contribution file; or
   (iii) any combination thereof.

3. The method of claim 2, further comprising generating the summary based upon: (i) at least a portion of the background file; (ii) at least a portion of the contribution file; or (iii) any combination thereof.

4. The method of claim 3, further comprising outputting the summary of the nonfiction article during inference stage.

5. The method of claim 1, wherein the nonfiction article comprises a scientific or technical article.

6. A system for training a natural language processing (NLP) classifier, comprising:
   a non-transitory memory; and
   one or more processors coupled to the non-transitory memory and configured to read instructions from the non-transitory memory to cause the system to perform operations comprising:
   receiving a portion of the nonfiction article, wherein the portion comprises a plurality of text segments and wherein the portion is associated with citation information including: (i) an inbound citation that post-dates the nonfiction article, (ii) an outbound citation that pre-dates the nonfiction article, or (iii) any combination thereof;
   inputting the portion of the nonfiction article and the citation information associated with the portion to a natural language processing (NLP) model;
   for a text segment of the plurality of text segments in the portion:
   (i) determining, by the NLP model, that a first part of the text segment is background information by detecting an outbound citation associated with the text segment;
   (ii) determining, by the NLP model, that a second part of the text segment is a new contribution attributable to the nonfiction article by detecting an inbound citation associated with the text segment, or
   (iii) any combination thereof;
   computing a loss objective based at least in part on: (i) a first conditional probability distribution of the background information conditioned on given information of the outbound citation; (ii) a second conditional probability distribution of the new contribution conditioned on given information of the inbound citation; or (iii) any combination thereof, wherein the loss objective is computed by a cross-entropy loss of the NLP model minus a weighted version of the informativeness term that is based on the first conditional probability distribution or the second conditional probability distribution depending on a mode of the nonfiction article; and updating the NLP model using the loss objective via backpropagation.

7. The system of claim 6, wherein the operations further comprise:
(i) including the first part in a background file;
(ii) including the second part in a contribution file; or
(iii) any combination thereof.

8. The system of claim 7, wherein the operations further comprise generating the summary based upon: (i) at least a portion of the background file; (ii) at least a portion of the contribution file; or (iii) any combination thereof.

9. The system of claim 8, wherein the operations further comprise outputting the summary.

10. The system of claim 6, wherein the nonfiction article comprises a scientific or technical article.

11. A non-transitory, machine-readable medium having stored thereon machine-readable instructions executable to cause a system to perform operations comprising:
receiving a portion of the nonfiction article, wherein the portion comprises a plurality of text segments and wherein the portion is associated with citation information including: (i) an inbound citation that post-dates the nonfiction article, (ii) an outbound citation that pre-dates the nonfiction article, or (iii) any combination thereof;
inputting the portion of the nonfiction article and the citation information associated with the portion to a natural language processing (NLP) model;
for a text segment of the plurality of text segments in the portion:
(i) determining, by the NLP model, that a first part of the text segment is background information by detecting an outbound citation associated with the text segment;
(ii) determining, by the NLP model, that a second part of the text segment is a new contribution attributable to the nonfiction article by detecting an inbound citation associated with the text segment, or
(iii) any combination thereof;
computing a loss objective based at least in part on: (i) a first conditional probability distribution of the background information conditioned on given information of the outbound citation; (ii) a second conditional probability distribution of the new contribution conditioned on given information of the inbound citation; or (iii) any combination thereof, wherein the loss objective is computed by a cross-entropy loss of the NLP model minus a weighted version of the informativeness term that is based on the first conditional probability distribution or the second conditional probability distribution depending on a mode of the nonfiction article; and
updating the NLP model using the loss objective via backpropagation.

12. The non-transitory, machine-readable medium of claim 11, wherein the operations further comprise:
(i) including the first part in a background file;
(ii) including the second part in a contribution file; or
(iii) any combination thereof.

13. The non-transitory, machine-readable medium of claim 12, wherein the operations further comprise generating the summary based upon: (i) at least a portion of the background file; (ii) at least a portion of the contribution file; or (iii) any combination thereof.

14. The non-transitory, machine-readable medium of claim 11, wherein the operations further comprise outputting the summary.

* * * * *